US012253814B2

(12) United States Patent
Akamatsu et al.

(10) Patent No.: US 12,253,814 B2
(45) Date of Patent: Mar. 18, 2025

(54) FIXING DEVICE AND IMAGE FORMING APPARATUS

(71) Applicant: CANON KABUSHIKI KAISHA, Tokyo (JP)

(72) Inventors: Takaaki Akamatsu, Kanagawa (JP); Toru Imaizumi, Kanagawa (JP); Shoichiro Ikegami, Kanagawa (JP); Yuki Oshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/401,176

(22) Filed: Dec. 29, 2023

(65) Prior Publication Data

US 2024/0241466 A1 Jul. 18, 2024

(30) Foreign Application Priority Data

Jan. 18, 2023 (JP) ................................ 2023-005656

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC ...................... G03G 15/2053; G03G 15/2064
USPC ................................ 399/122, 320, 328–331
See application file for complete search history.

(56) References Cited

U.S. PATENT DOCUMENTS

| | | | | |
|---|---|---|---|---|
| 11,531,292 | B2 * | 12/2022 | Suzuki | G03G 15/2028 |
| 2007/0065191 | A1 | 3/2007 | Iwasaki | |

FOREIGN PATENT DOCUMENTS

| | | | |
|---|---|---|---|
| CN | 112462586 | * | 3/2021 |
| JP | 2004279702 | * | 10/2004 |
| JP | 2007079507 | A | 3/2007 |

* cited by examiner

*Primary Examiner* — Hoan H Tran
(74) *Attorney, Agent, or Firm* — Canon U.S.A., Inc. IP Division

(57) ABSTRACT

A fixing device includes first and second rotation members, a heater holder having a protrusion, and a heater having a heating element and a substrate having a longitudinal direction and a thickness direction. The protrusion is disposed at a position, which is outside a nip portion and on a downstream side in a conveyance direction of a recording material, and comes into contact with the first rotation member. The protrusion protrudes in the thickness direction toward the second rotation member without crossing a nip tangent line that passes through a contact surface between the first rotation member and the second rotation member and extends parallel to the contact surface, and a length in the longitudinal direction of the protrusion is shorter than a length in the longitudinal direction of the recording material of a maximum size which is able to be conveyed.

13 Claims, 15 Drawing Sheets

FIXING DEVICE AND IMAGE FORMING APPARATUS

BACKGROUND

Field

The present disclosure relates to a fixing device, particularly to a fixing device that is used in an image forming apparatus, such as an electrophotographic copying machine or a laser printer.

Description of the Related Art

A film heating type fixing device has been conventionally known as a fixing device that is used in electrophotographic image forming apparatuses. For example, United States patent Application Publication No. 2007/0065191 is directed to an image heating apparatus having a cylindrical film, a heating member which contacts an internal periphery of the cylindrical film, and a drive roller which forms a nip portion with the heating member through the cylindrical film. A recording material bearing an image is heated while the recording material is nipped and conveyed by the nip portion.

A conventional film heating type fixing device includes a film unit and a pressure roller which forms a nip portion with the film unit. The film unit mainly includes a heater having a resistance heating element on a ceramic substrate, a cylindrical fixing film that is heated and rotated while being in contact with the heater, and a film guide that is a support member of the fixing film and the heater. The film unit further includes a pressure stay for applying pressure toward the pressure roller facing the film guide. A recording material on which an unfixed toner image is formed is heated and pressed at the nip portion. As a result, the toner image on the recording material is fixed on the recording material.

In the conventional film heating type fixing device, particularly in a case where recording materials each having a width narrower than a length of the fixing film in an axial direction of the fixing film are continuously fed, there arises an issue that wrinkles are generated in the recording materials. Some conventional film heating type fixing device configurations include a protrusion disposed in a film guide to suppress occurrence of wrinkles in recording materials even in a case where small-size sheets are continuously conveyed. However, due to the protrusion being in contact with an inner peripheral surface of the film, sliding resistance is generated, which may result in density unevenness of an image.

SUMMARY

Disclosed is a fixing device that is for suppressing an influence on an image while occurrence of wrinkles in recording materials is suppressed.

According to an aspect of the present disclosure, a fixing device includes a first rotation member, a heater having an elongated shape and configured to include a heating element and a substrate on which the heating element is disposed, wherein the heater is disposed in an internal space of the first rotation member, a heater holder configured to hold the heater, and a second rotation member, wherein, to fix an image formed on a recording material, the heater and the second rotation member nip the first rotation member therebetween, and the image formed on the recording material is heated at a nip portion via the first rotation member, wherein the heater holder has a protrusion that is disposed at a position, which is outside the nip portion and on a downstream side in a conveyance direction of the recording material, and comes into contact with the first rotation member, and wherein, when a direction of a long side of a first surface of the substrate on which the heating element is disposed is a longitudinal direction, a direction orthogonal to the longitudinal direction on the first surface is a lateral direction, and a direction orthogonal to the longitudinal direction and the lateral direction is a thickness direction, the protrusion protrudes in the thickness direction toward the second rotation member without crossing a nip tangent line that passes through a contact surface between the first rotation member and the second rotation member and extends parallel to the contact surface, and a length in the longitudinal direction of the protrusion is shorter than a length in the longitudinal direction of the recording material of a maximum size which is able to be conveyed.

According to the present disclosure, it is possible to suppress an influence on an image while occurrence of wrinkles in recording materials is suppressed.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the drawings. The following exemplary embodiments do not limit the present disclosure according to the appended claims, and not all combinations of features described in the exemplary embodiments are necessarily mandatory.

(Image Forming Apparatus)

Figure 1:
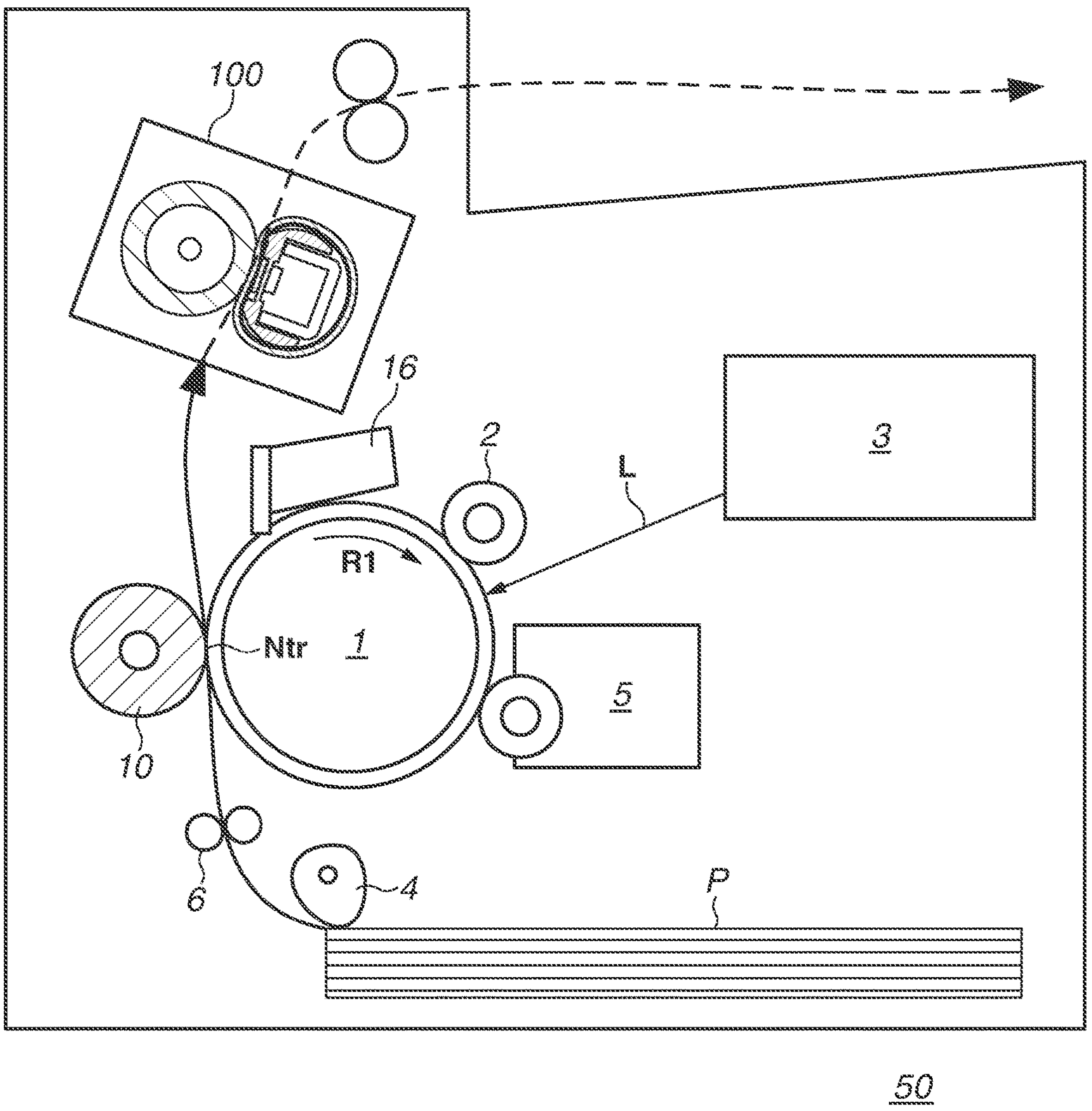
FIG. 1 is a schematic configuration diagram illustrating an image forming apparatus.

FIG. 1 is a schematic configuration diagram of an image forming apparatus 50. The image forming apparatus 50 is an electrophotographic image forming apparatus that transfers a toner image on a photosensitive drum 1 onto a recording material P (sheet P), which is, for example, paper. On a peripheral surface of the photosensitive drum 1, a charger 2, an exposure device 3, a developing device 5, a transfer roller 10, and a photosensitive drum cleaner 16 are disposed in this order in a rotational direction (direction indicated by an arrow R1).

A surface of the photosensitive drum 1 is charged to a negative polarity by the charger 2. The photosensitive drum 1 that has been charged is irradiated with laser light L emitted from the exposure device 3. An electrostatic latent image is formed on the surface of the photosensitive drum 1 by the laser light L. In a first exemplary embodiment, toner is charged to a negative polarity. A color of the toner is black, and the toner is accommodated in the developing device 5. In response to application of a developing bias, the developing device 5 develops the electrostatic latent image on the photosensitive drum 1. As a result, the toner is deposited on the electrostatic latent image, whereby a toner image T as an image is formed on the photosensitive drum 1.

The recording material P is stacked in a sheet feeding cassette and is fed by a sheet feeding roller 4. The recording material P that has been fed is conveyed to a transfer nip Ntr by a conveyance roller 6. A transfer bias of a positive polarity, which is opposite to the polarity of the toner, is applied to the transfer roller 10 from a power source (not illustrated). Consequently, the toner image T formed on the photosensitive drum 1 is transferred onto the recording material P at the transfer nip Ntr. The photosensitive drum cleaner 16 having an elastic blade removes transfer residual toner from the surface of the photosensitive drum 1 from which the toner image T has been transferred. The recording material P onto which the toner image T has been transferred by the transfer roller 10 is conveyed to a fixing device 100. In the fixing device 100, the recording material P is heated and pressed, whereby the toner image T is fixed onto the recording material P. The recording material P onto which the toner image T has been fixed is discharged to a sheet discharge tray, and the image formation is completed.

(Fixing Device)

The fixing device 100 will be described with reference to FIGS. 2 and 3. A direction along a long side of a heater 113 having an elongated shape illustrated in FIGS. 2 and 3 will be sometimes referred to as a longitudinal direction (X direction in FIGS. 2 and 3), and a direction along a short side of the heater 113 orthogonal to the longitudinal direction will be sometimes referred to as a lateral direction (Y direction in FIGS. 2 and 3). A thickness direction of the heater 113 orthogonal to the longitudinal direction and the lateral direction will be sometimes referred to as a thickness direction (Z direction in FIGS. 2 and 3).

The fixing device 100 in the present exemplary embodiment is a fixing device of a film heating type which is used for the purpose of shortening a start-up time and lowering a power consumption. FIG. 2 is a cross-sectional view of a vicinity of a center portion of the fixing device 100 in the longitudinal direction, and FIG. 3 is a view illustrating both end portions of the fixing device 100 in the longitudinal direction. A fixing film 112 as a first rotation member has an outer diameter(Φ) of 18 millimeters (mm) in a state in which the fixing film 112 is in a cylindrical shape, and has a multi-layer structure in the thickness direction. Layers of the fixing film 112 includes at least a base layer which maintains the strength of the fixing film 112, and a release layer which reduces adhesion of dirt to a surface. A material of the base layer is required to have heat resistance because the fixing film 112 receives heat from the heater 113. The material also requires strength because the fixing film 112 slides on the heater 113. Thus, a metal, such as stainless steel or nickel, or a heat-resistant resin, such as polyimide, may be used. In the present exemplary embodiment, as the material of the base layer of the fixing film 112, a polyimide resin is used, and a carbon-based filler is added to the polyimide resin to improve the thermal conductivity and the strength. The thinner the base layer is, the easier the heat of the heater 113 is transmitted to the recording material P. However, the strength decreases with decrease in the thickness. Thus, the thickness of the fixing film 112 is desirably about 15 μm to 100 μm, and in the present exemplary embodiment, the thickness of the fixing film 112 is 60 μm.

As a material of the release layer of the fixing film 112, a fluororesin, such as perfluoroalkoxy resin (PFA), polytetrafluoroethylene resin (PTFE), or tetrafluoroethylene-hexafluoropropylene resin (FEP) is desirably used. In the present exemplary embodiment, PFA which is excellent in release property and heat resistance among various types of fluororesin is used for the fixing film 112. The release layer may be covered with a tube or a surface of the release layer may be coated with a coating material. In the present exemplary embodiment, the release layer is formed by coating which is excellent in thin wall forming. The thinner the release layer is, the more easily the heat of the heater 113 is transmitted to the surface of the fixing film 112, but if the release layer is too thin, the durability is lowered. Thus, the thickness is desirably from 5 μm to 30 μm, and in the present exemplary embodiment, the thickness is 10 μm. Although not used in the present exemplary embodiment, an elastic layer may be disposed between the base layer and the release layer. In this case, examples of a material of the elastic layer include silicone rubber and fluororubber.

A film guide 130 is disposed in an internal space of the fixing film 112. The film guide 130 has a substantially semi-circular gutter shape in a cross section and is formed of a liquid crystal polymer resin having high heat resistance to satisfy heat resistance and rigidity. In the present exemplary embodiment, SUMIKASUPER® E5204L manufactured by Sumitomo Chemical Co., Ltd. is used as the liquid crystal polymer resin. The film guide 130 also functions as a heater holder that holds the heater 113. The fixing film 112 is loosely fitted onto the film guide 130, so that the film guide 130 guides rotation of the fixing film 112. The film guide 130 will be described in detail below.

A pressing stay 119 is disposed in the longitudinal direction of the film guide 130. The pressing stay 119 includes a bent metal plate having high rigidity, such as stainless steel, to press the film guide 130 substantially uniformly in the longitudinal direction.

A pressure roller 110 as a second rotation member has an outer diameter(Φ) of 20 mm and includes a core metal 117 made of iron having an outer diameter(Φ) of 14 mm and an elastic layer 116 having a thickness of 3.0 mm. As a material of the elastic layer 116, solid rubber or foamed rubber is used. Because the foamed rubber has a low heat capacity and a low thermal conductivity, the heat of a surface of the pressure roller 110 is hardly absorbed into the inside of the foamed rubber. Thus, using the foamed rubber has an advantage in that the surface temperature is easily increased and rise time for fixing can be shortened. In the present exemplary embodiment, foamed rubber that has been produced by foaming silicone rubber is used for the pressure roller 110. A release layer 118 made of perfluoroalkoxy resin (PFA) is formed as a toner release layer on the elastic layer 116. The release layer 118 may be covered with a tube or a surface of the release layer 118 may be coated with a coating material, similarly to the release layer of the fixing film 112. In the present exemplary embodiment, a tube which is excellent in durability is used. As the material of the release layer 118, a fluororesin, such as PTFE or FEP, fluororubber or silicone rubber having good releasability, or the like may be used instead of PFA. The lower the surface hardness of the pressure roller 110 is, the lighter the pressure required to obtain the width of a fixing nip Nf, but the surface hardness is required to be determined in consideration of durability. In the present exemplary embodiment, a material having the Asker C hardness of 50 points (4.9 newton (N) load) is used for the release layer 118.

The heater 113 is a heater that is generally used in film heating type fixing devices, and in which a resistance heating element (hereinafter, also referred to as a heating element) is disposed on a first surface of a ceramic substrate. The heater 113 is coated with a heating element of silver-palladium (Ag/Pd) having a thickness of ten-odd micrometers (μm) formed by screen-printing on a surface of an alumina substrate having a width of 6 mm in the lateral direction and a thickness of 1 mm in the thickness direction. The heating element is covered with glass having a thickness of 60 μm which protects the heating element and ensures slidability. The temperature of the heater 113 is adjusted by controlling electric power to be supplied to the heater 113 in accordance with a signal from a temperature detection element (not illustrated) for detecting the temperature of the substrate or the fixing film 112. The heater 113 is fitted into a groove portion formed in the film guide 130 to be fixed and supported. In the present exemplary embodiment, the heater 113 is disposed such that a center of the heater 113 is disposed at a position which is 0.4 mm away from a center of the pressure roller 110 in the lateral direction and on an upstream side in a conveyance direction of the recording material P.

Figure 3:
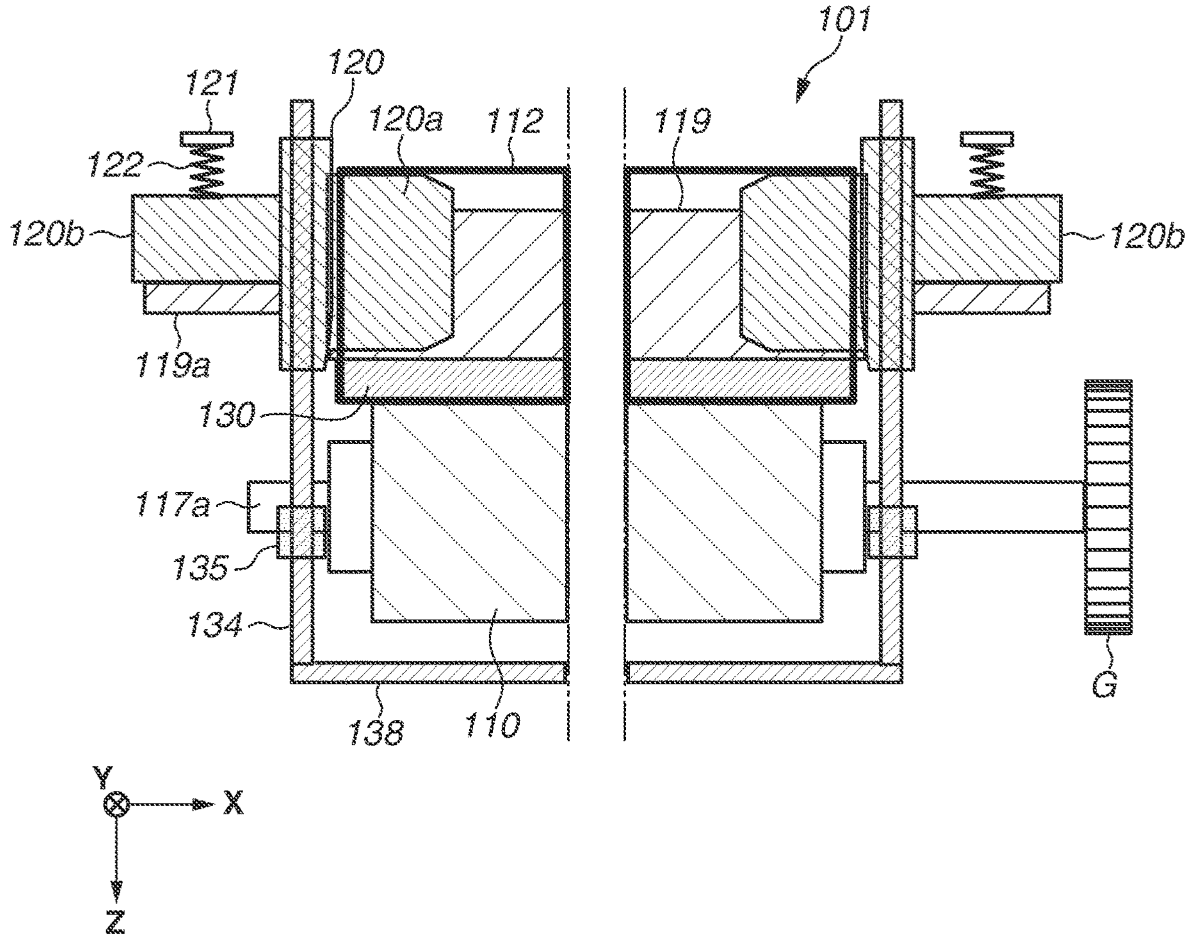
FIG. 3 is a view illustrating both end portions of the fixing device in the longitudinal direction.

As illustrated in FIG. 3, outward extension arms **119*a* are each disposed on left and right sides with respect to the pressing stay 119 in the longitudinal direction, and fixing flanges 120 on the left and right sides respectively fit the outward extension arms 119*a* into the pressing stay 119. A film unit 101 is disposed above the pressure roller 110 in approximately parallel to the pressure roller 110 in such an orientation that the heater 113 is on a side with the pressure roller 110. The film unit 101 is disposed between left and right side plates 134 of a device frame 138. A core metal shaft portion 117*a* of the pressure roller 110 is placed on bearing members 135 engaged with the left and right side plates 134 of the device frame 138. The fixing flanges 120 on the left and right sides are respectively engaged with vertical edge portions of vertical guide slits on the left and right side plates 134. In the present exemplary embodiment, as a material of the fixing flanges 120**, a liquid crystal polymer resin is used.

Pressure springs 122 are each disposed in a compressed state between pressure portions **120*b* of the fixing flanges 120 on the left and right sides and pressure spring support portions 121. In this configuration, the heater 113 is pressed against an upper surface of the pressure roller 110 with the fixing film 112 interposed therebetween with a predetermined pressing force that is applied via the fixing flanges 120 on the left and right sides, the pressing stay 119 and the film guide 130. In the present exemplary embodiment, a pressure of the pressure springs 122 is set such that a pressing force between the fixing film 112 and the pressure roller 110 is 15 kilograms (kg). At the fixing nip Nf, the fixing film 112 is nipped between the heater 113 and the pressure roller 110 and warps on a flat surface of a lower side of the heater 113, and an inner peripheral surface of the fixing film 112 is in close contact with the flat surface of the lower side of the heater 113. Fixing film regulation portions 120*a* of the fixing flanges 120 each have a shape matching a normal shape of the fixing film 112** being pressed at the fixing nip Nf.

Figure 2:
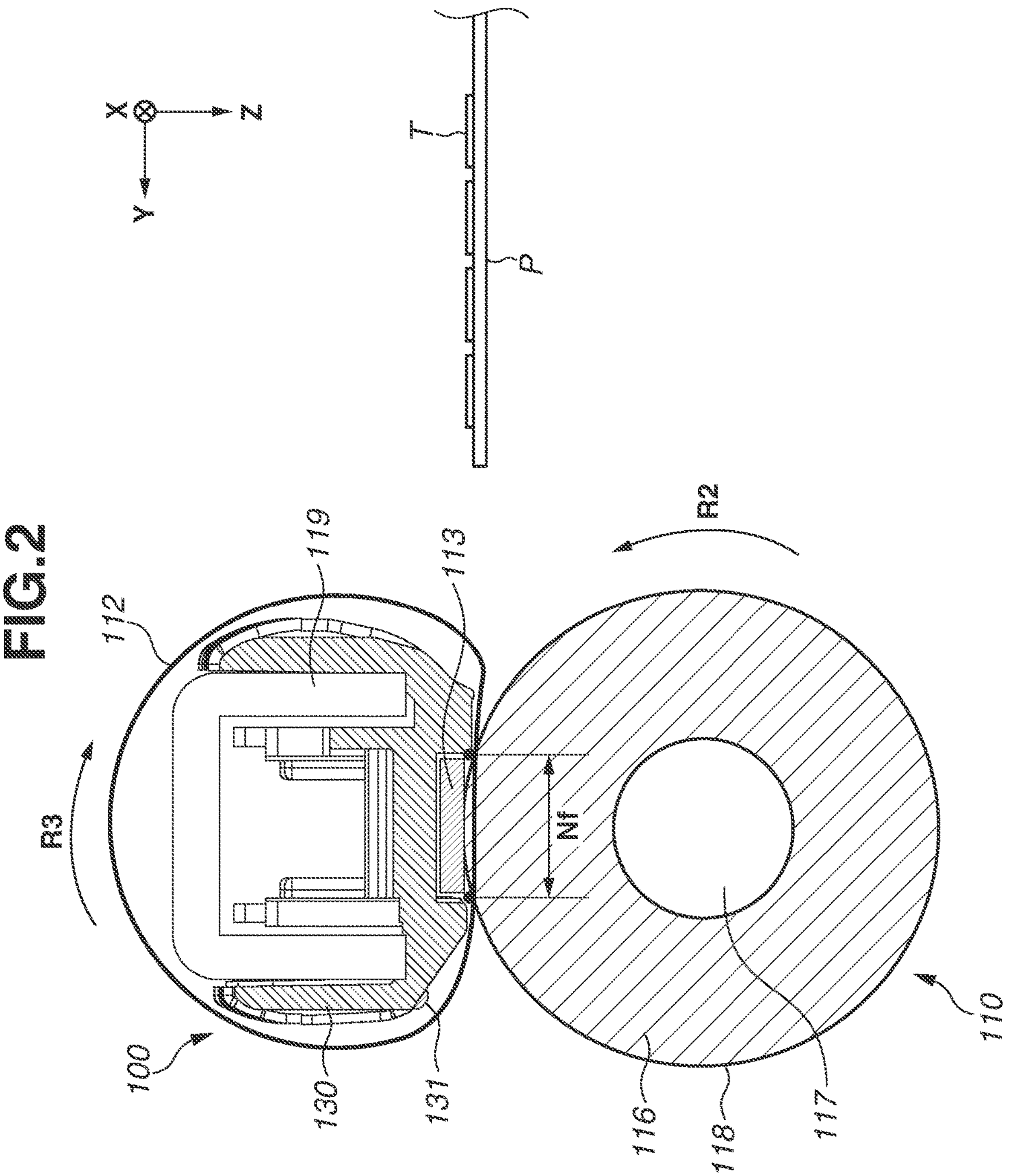
FIG. 2 is a cross-sectional view illustrating a vicinity of a center portion of a fixing device in a longitudinal direction.

When a rotational force is transmitted from a driving mechanism unit (not illustrated) to a driving gear G of the pressure roller 110, the pressure roller 110 is rotationally driven at a predetermined speed in a direction indicated by an arrow R2 in FIG. 2. Together with rotation of the pressure roller 110, a rotational force acts on the fixing film 112 due to a frictional force between the pressure roller 110 and the fixing film 112 at the fixing nip Nf. Consequently, the fixing film 112 is rotated by the rotation of the pressure roller 110 in a direction indicated by an arrow R3 in FIG. 2 around the film guide 130 while the inner peripheral surface of the fixing film 112 is in close contact with and slides on the lower side of the heater 113. The fixing film 112 is controlled to rotate at a surface moving speed of 200 millimeters per second (mm/sec). With a heat-resistant lubricant applied to an inner peripheral surface of the fixing film 112, the heater 113 and the film guide 130 and the inner peripheral surface of the fixing film 112 are slidable with each other. In the present exemplary embodiment, fluorine-based grease is used as the lubricant. Specifically, a perfluoropolyether (PFPE) oil is used as the base oil, and a grease mixed with polytetrafluoroethylene (PTFE) powder is used as an enhancer.

(Film Guide 130)

Figure 4:
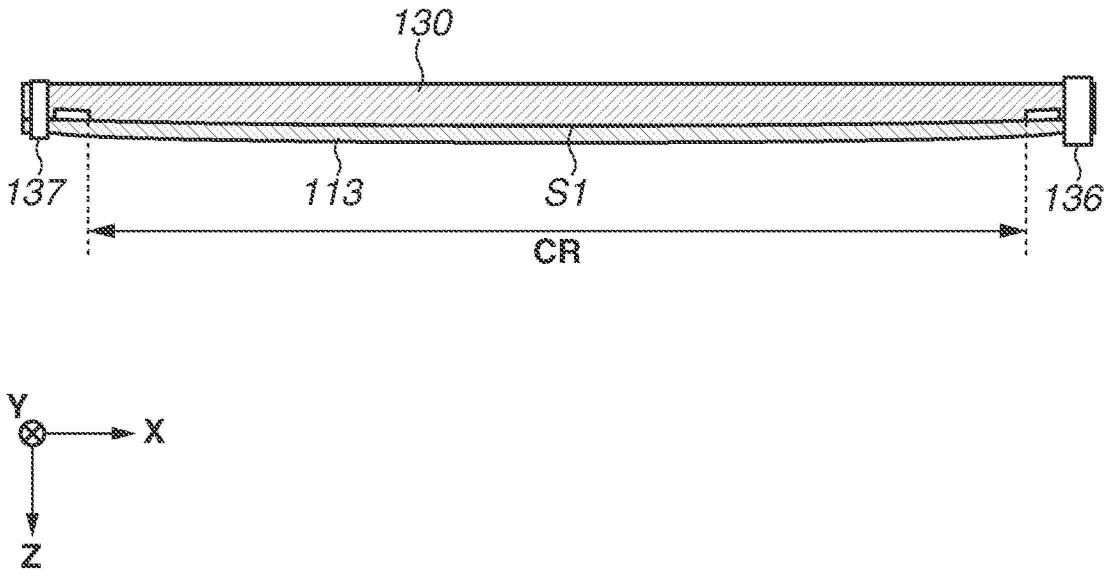
FIG. 4 is a schematic view illustrating a film guide.

FIG. 4 is a schematic view of the film guide 130. A crown shape of the film guide 130 in the longitudinal direction will be described. As illustrated in FIG. 4, the film guide 130 includes a heater seat surface S1 supporting the heater 113. In the longitudinal direction, a center portion of the heater seat surface S1 is in a crown shape that curves toward the pressure roller 110 in comparison with end portions of the heater seat surface S1. The heater 113 is supported by a heater power supply portion 136 and a heater clip 137 at the respective ends in the longitudinal direction so that the heater 113 is disposed along the heater seat surface S1. The crown shape is a gentle quadratic curve shape in a region CR having a width of 225 mm in the longitudinal direction corresponding to a position facing the pressure roller 110, and the center portion curves out toward the pressure roller 110 by 0.4 mm in comparison with the end portions. With the crown shape, for example, even in a state in which the pressing stay 119 and the core metal 117 of the pressure roller 110 are bent and deformed due to an applied pressure, the fixing nip Nf having a substantially uniform width in the longitudinal direction can be formed. As described above, the fixing nip Nf as the nip portion in the present exemplary embodiment has a width of 6.2 mm with respect to the lateral direction.

(Protrusion 131 of Film Guide 130)

Figure 5:
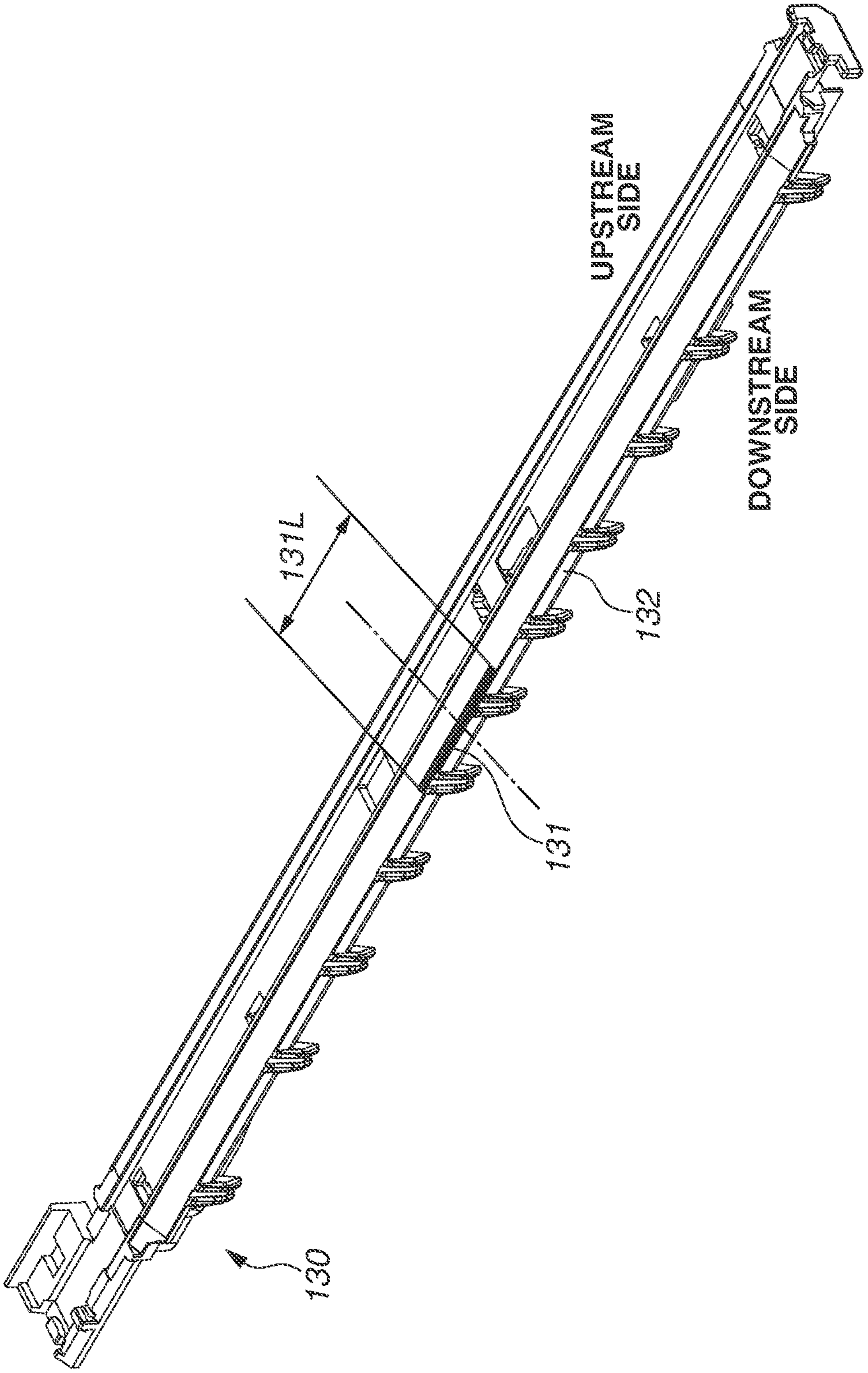
FIG. 5 is a perspective view illustrating the film guide.
Figure 6:
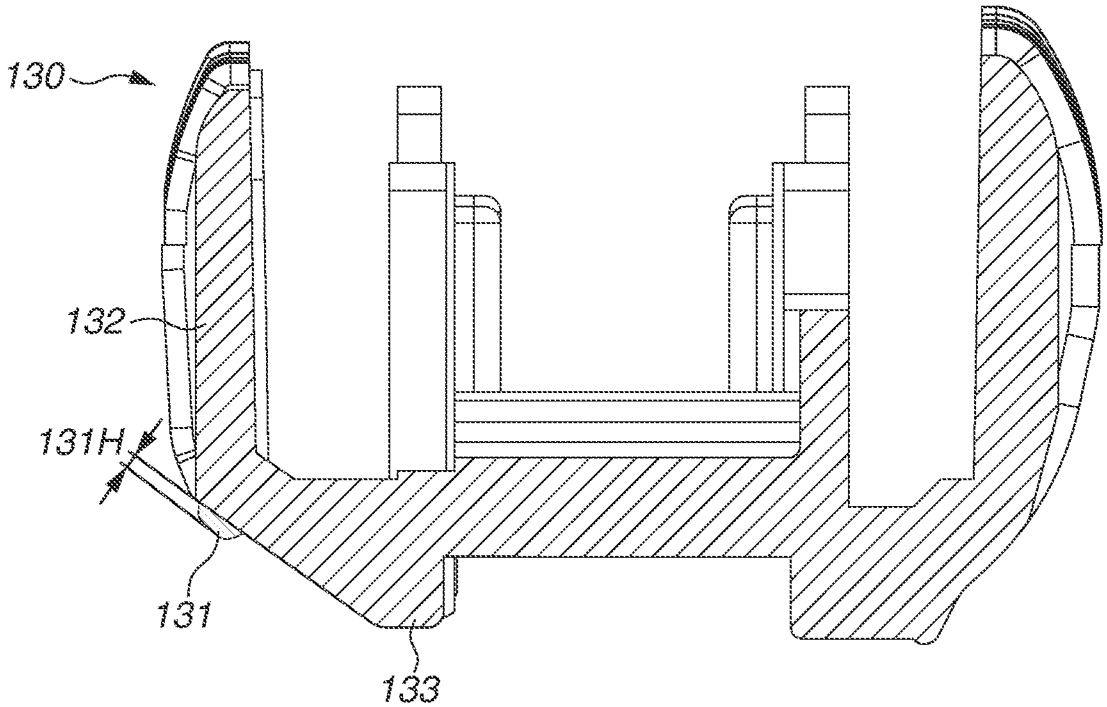
FIG. 6 is a cross-sectional view illustrating the film guide.

A configuration of a protrusion 131 of the film guide 130 which is a feature of the present exemplary embodiment will be described with reference to FIGS. 5 and 6. FIG. 5 is a perspective view illustrating the film guide 130 of the present exemplary embodiment. As illustrated in FIG. 5, the protrusion 131 is disposed to the film guide 130 at a position that is outside the fixing nip Nf and on the downstream side in the conveyance direction (lateral direction) of the recording material P, along the crown shape of the film guide 130. The protrusion 131 has a length 131L of 25 mm in the longitudinal direction. FIG. 6 is a cross-sectional view illustrating the film guide 130 of the present exemplary embodiment. A height 131H of the protrusion 131 illustrated in FIG. 6 is 0.3 mm.

The protrusion 131 has such a shape that does not protrude toward the pressure roller 110 in the thickness direction beyond a film receiving portion 133 in the thickness direction. That is, the protrusion 131 protrudes toward the pressure roller 110 in the thickness direction without crossing a nip tangent line that passes through a contact surface between the fixing film 112 and the pressure roller 110 and extends parallel to the contact surface.

The protrusion 131 also has such a shape that protrudes toward the pressure roller 110 beyond a side wall 132 on the downstream side in the conveyance direction. This shape can bring the fixing film 112 and the protrusion 131 into a contact state and a non-contact state in accordance with the width of the recording material P in the longitudinal direction. Detailed description of the fixing film 112 and the protrusion 131 and the effect of the protrusion 131 will be given below.

A description will be given of a shape of the fixing film 112 in a case where the film guide 130 has a configuration of a comparative example and recording materials P having different widths in the longitudinal direction are conveyed. In the present exemplary embodiment, a letter (LTR) size sheet as a first size sheet will be sometimes referred to as a large-size sheet. An A5 size sheet as a second size sheet will be sometimes referred to as a small-size sheet.

(Shape of Fixing Film 112 in Conveyance of Large-Size Sheet)

Figure 7A:
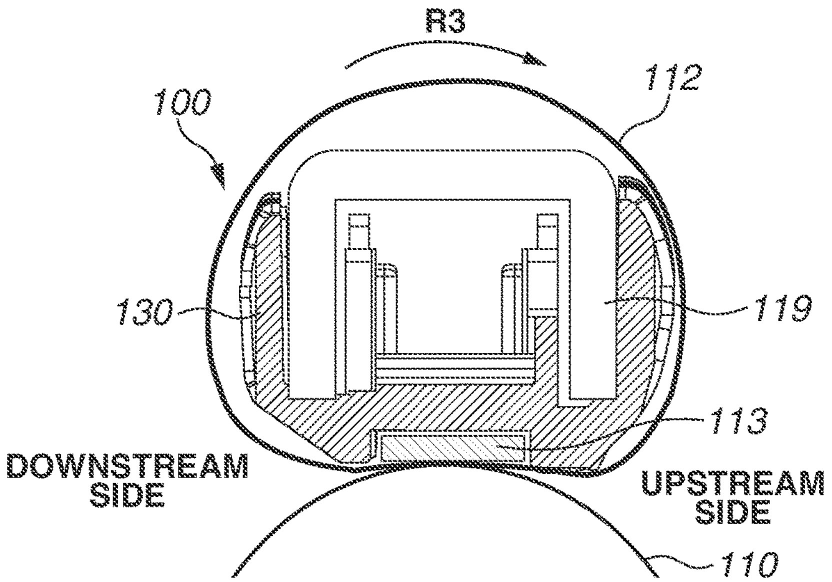
FIGS. 7A and 7B are diagrams illustrating a configuration of a comparative film guide.
Figure 7B:
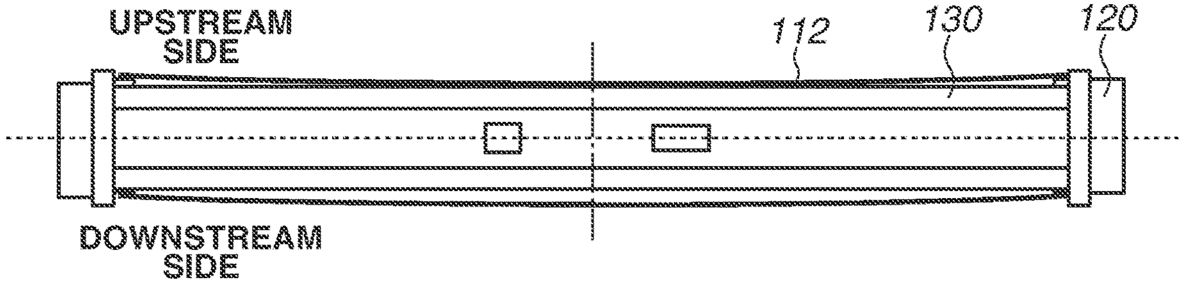

FIGS. 7A and 7B are diagrams illustrating a configuration of a film guide 130 of the comparative example. A shape of the fixing film 112 in a state where the large-size sheet is conveyed with the film guide 130 of the comparative example will be described. The film guide 130 of the comparative example has a configuration without the protrusion 131, unlike the configuration of the film guide 130 of the present exemplary embodiment.

FIG. 7A is a diagram illustrating a shape of the fixing film 112 in a fixing device 100 of the comparative example in a state in which the large-size sheet is conveyed. The cross-sectional view is of a center portion of the fixing device 100 of the comparative example in the longitudinal direction. In conveyance of the large-size sheet, the vicinity of the center portion of the fixing film 112 in the longitudinal direction is pulled toward a downstream side of a conveyance direction of a recording material P with respect to the film guide 130.

Consequently, a gap between the fixing film 112 and the film guide 130 on the upstream side is reduced. This is because the fixing film 112 receives a force acting from the upstream side to the downstream side in the conveyance direction from the recording material P in a fixing nip Nf, and the shape of the fixing film 112 is deformed.

The shape of the fixing film 112 in the longitudinal direction will be described with reference to FIG. 7B. As described in FIG. 3, since both the end portions of the fixing film 112 are regulated by fixing flanges 120, even when the fixing film 112 receives a force acting in the conveyance direction from the recording material P, movement of the fixing film 112 toward the downstream side is regulated. Thus, the fixing film 112 in conveyance of the large-size sheet is warped in an arched shape toward the downstream side in the conveyance direction of the recording material P.

(Temperature Rise at Non-Sheet-Passing Area in Conveyance of Small-Size Sheet)

In continuous conveyance of the small-size sheets, a surface temperature of a non-sheet-passing area (which is a part of an area of the fixing nip Nf and where the recording material P does not pass, in the longitudinal direction) of the pressure roller 110 is increased in comparison with a case of conveyance of the large-size sheet. This is because heat is not taken away by the recording material P in the area where the recording material P does not pass. This phenomenon is sometimes called “non-sheet-passing area temperature rise”. If the non-sheet-passing area temperature rise occurs, the surface temperature of the pressure roller 110 has a temperature distribution having a thermal peak in the non-sheet-passing area in a heat generation area of the heating element in the longitudinal direction.

(Shape of Fixing Film 112 in Conveyance of Small-Size Sheet)

Figure 8A:
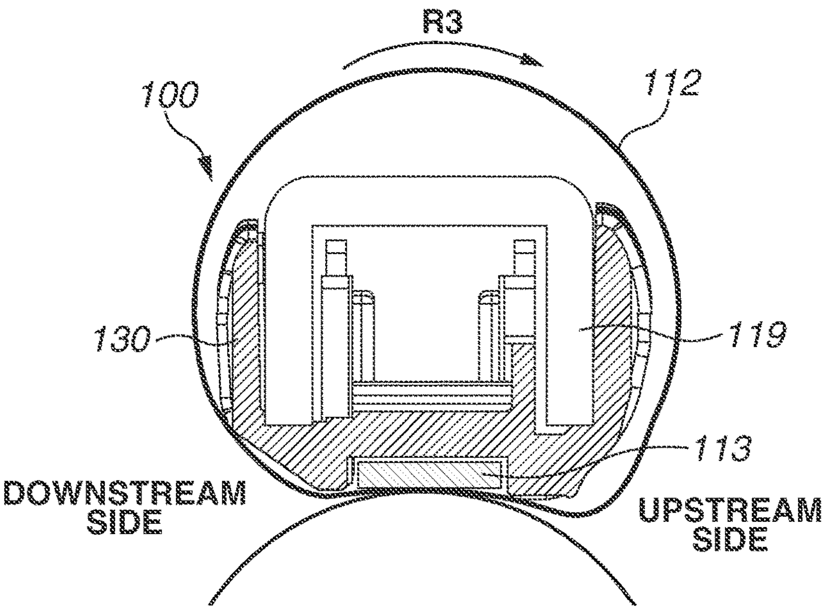
FIGS. 8A and 8B are diagrams illustrating the configuration of the comparative film guide.
Figure 8B:
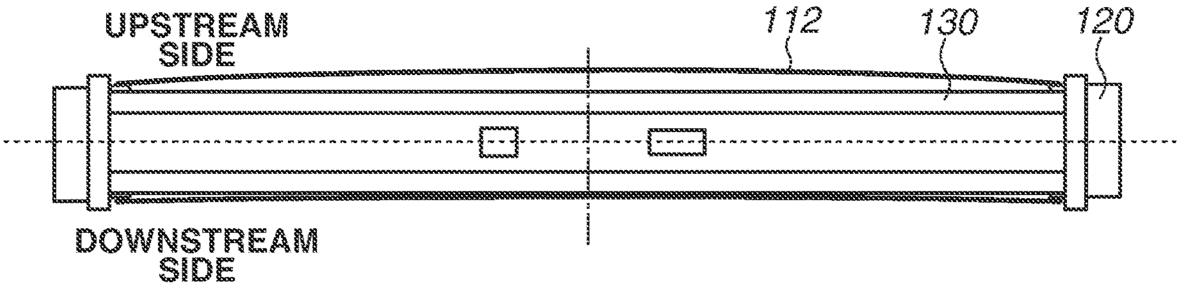

FIGS. 8A and 8B are diagrams illustrating the configuration of the film guide 130 of the comparative example. The shape of the fixing film 112 in a state in which the small-size sheet is conveyed with the film guide 130 of the comparative example will be described.

FIG. 8A is a diagram illustrating a shape of the fixing film 112 in a state where the small-size sheet is conveyed in the fixing device 100 of the comparative example. The cross-sectional view is of the center portion of the fixing device 100 of the comparative example in the longitudinal direction. In conveyance of the small-size sheet, the vicinity of the center portion of the fixing film 112 in the longitudinal direction moves toward the upstream side in the conveyance direction of the recording material P with respect to the film guide 130. Consequently, a gap between the fixing film 112 and the film guide 130 on the downstream side is reduced.

This is related to the above-described non-sheet-passing area temperature rise of the pressure roller 110 in conveyance of the small-size sheet. In general, the pressure roller 110 having an elastic layer formed of silicone rubber tends to have a larger thermal expansion of the outer diameter in the non-sheet-passing area than in the sheet-passing area. Thus, a conveyance force by the pressure roller 110 tends to be larger in the non-sheet-passing area than in the sheet-passing area. This phenomenon can occur in conveyance of the small-size sheet with which occurrence probability of the non-sheet-passing area temperature rise is relatively high, and particularly, this phenomenon is obvious in a case where the small-size sheets are continuously conveyed. In continuous conveyance of the small-size sheets, the conveyance force at the center portion of the fixing film 112 is relatively smaller than the conveyance force at the end portions of the fixing film 112 in the longitudinal direction. As a result, as illustrated in FIG. 8A, the center portion of the fixing film 112 in the longitudinal direction moves toward the upstream side in the conveyance direction.

With reference to FIG. 8B, a shape of the fixing film 112 in the longitudinal direction will be described. Since both end portions of the film guide (heater holder) 130 in the longitudinal direction are fixed to the left and right side plates 134 of the device frame 138, the movement of the film guide 130 toward the upstream side in the conveyance direction is regulated. Consequently, the shape of the fixing film 112 in conveyance of the small-size sheet is different from the shape of the fixing film 112 in conveyance of the large-size sheet. More specifically, the fixing film 112 is warped in an arched shape toward the upstream side in the conveyance direction of the recording material P.

(Evaluation Method)

An evaluation method of evaluating an operational advantage according to the present exemplary embodiment will be described. As an evaluation method in the present exemplary embodiment, continuous conveyance of large-size sheets and continuous conveyance of small-size sheets were performed, and determination of whether wrinkles occurred in the recording materials P, and checking of images formed on the recording materials P were performed. In this evaluation, 50 sheets of LTR size sheets (Xerox Vitality 75 grams per square meter ($g/m^2$)) were used as the large-size sheets and were continuously conveyed at 47 pages per minute (ppm). Also, 50 sheets of A5 size sheets (Canon A5 PB PAPER 66 $g/m^2$) were used as the small-size sheets and were continuously conveyed at 30 ppm. In order to clarify the operational advantage of the present exemplary embodiment, the evaluation under the same conditions was also performed for t a comparative example described below.

(Evaluation Result of Comparative Example)

A result of the evaluation of the comparative example will be described with reference to FIGS. 7A and 7B and FIGS. 8A and 8B. The film guide 130 of the comparative example has the configuration without the protrusion 131. In an image forming apparatus including a fixing device including the film guide 130 of the comparative example, the LTR size sheets were continuously conveyed at 47 ppm, and the evaluation was performed. A result of the evaluation showed neither wrinkles in the sheets nor occurrence of image defects.

On the other hand, when the A5 size sheets were continuously conveyed at 30 ppm, and the evaluation was performed, gradual occurrence of wrinkles in the sheets was observed in center portions of the recording materials P after the tenth sheet. This is related to the fact that the fixing film 112 was warped in an arched shape toward the upstream side in the conveyance direction of the recording material P as described above. In a case where the fixing film 112 is deformed into such a shape, the center portion of the leading end area of the recording material P enters the fixing nip Nf prior to both end portions of the leading end area. Consequently, it was considered that a force directed from both end portions toward the center portion in the longitudinal direction acted on the recording material P, and wrinkles were generated in the vicinity of the center portion of the sheets.

A result of the evaluation of the comparative example will be described with reference to FIGS. 9A and 9B and FIGS. 10A and 10B. A film guide 130 of the comparative example has a configuration in which a protrusion 131 protruding toward the pressure roller 110 beyond the film receiving portion 133 is disposed on the downstream side of the film guide 130.

Figure 9A:
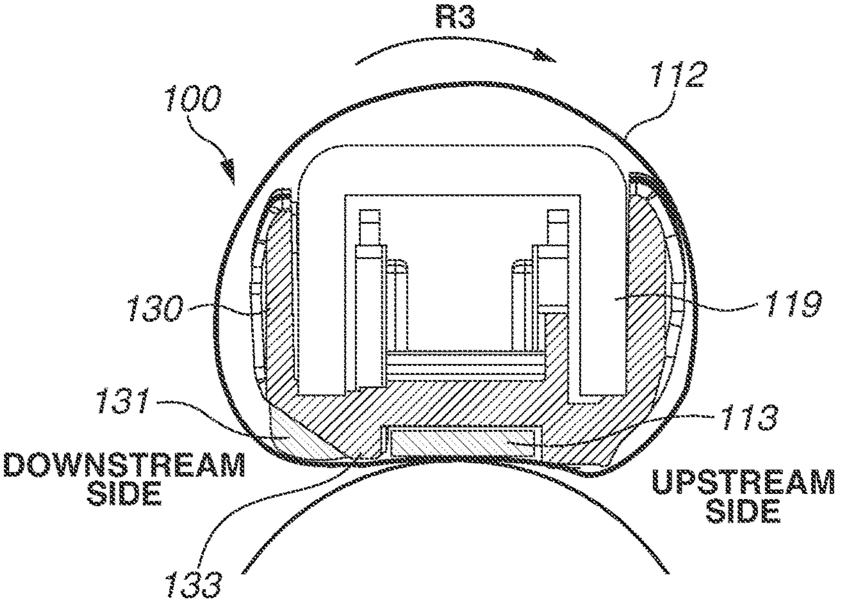
FIGS. 9A and 9B are diagrams illustrating a configuration of a film guide having a protrusion in a fixing device of a comparative example.
Figure 9B:
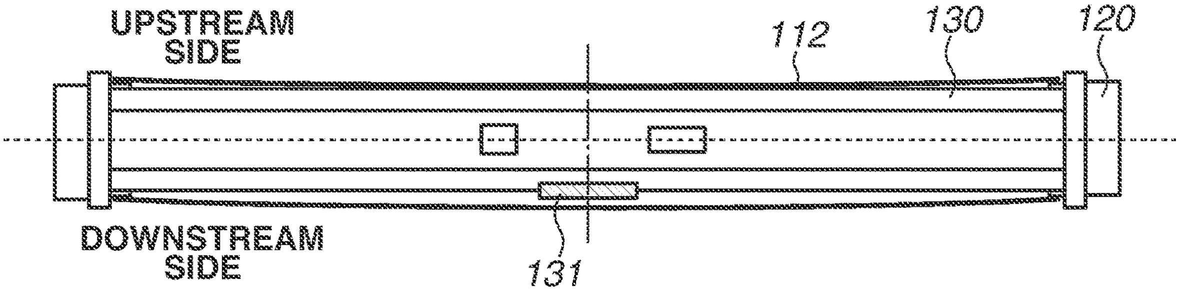
Figure 10A:
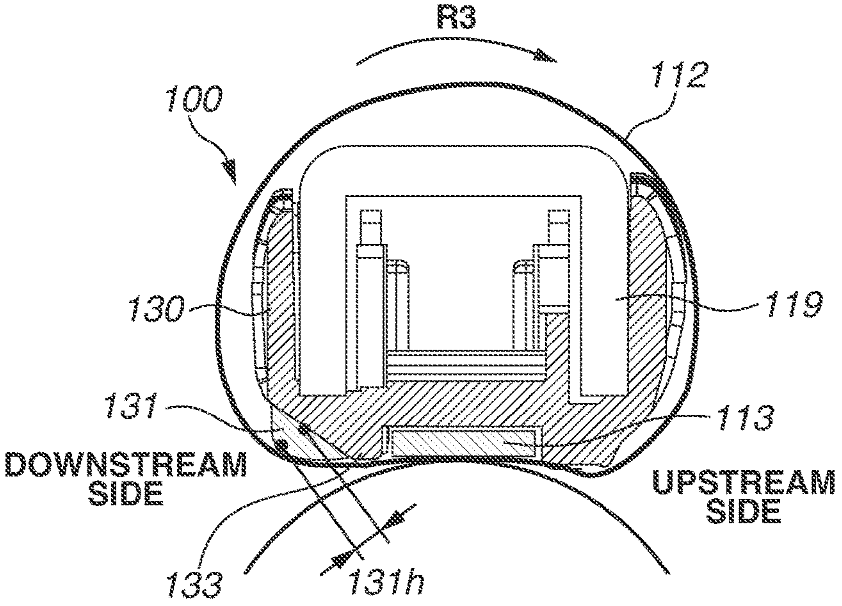
FIGS. 10A and 10B are diagrams illustrating the configuration of the film guide having the protrusion in the fixing device of the comparative example.
Figure 10B:
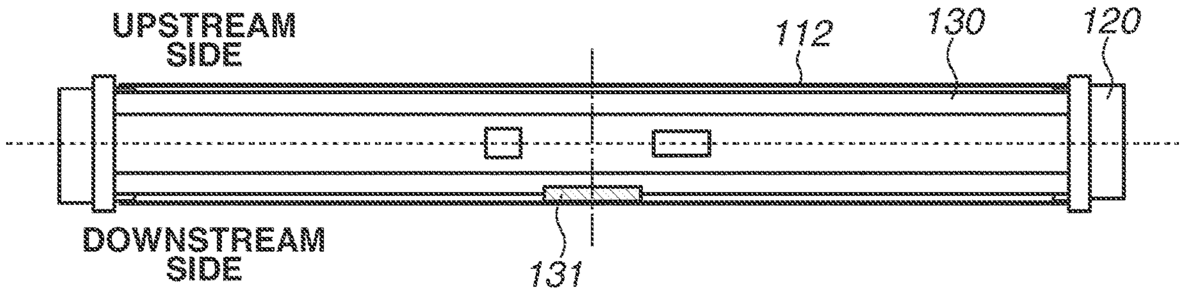

FIGS. 9A and 9B are diagrams illustrating a configuration of a fixing device 100 of the comparative example in which the film guide 130 has the protrusion 131. FIG. 9A is a cross-sectional view of the vicinity of a center portion of the fixing device 100 in the longitudinal direction. With reference to FIG. 9B, a shape of the fixing film 112 in conveyance of the large-size sheet will also be described. FIG. 10A is a cross-sectional view illustrating the vicinity of the center portion of the fixing device 100 in the longitudinal direction. With reference to FIG. 10B, a shape of the fixing film 112 in conveyance of the small-size sheet will also be described. In the configuration of the comparative example, since the protrusion 131 disposed on the film guide 130 protrudes toward the pressure roller 110 beyond the film receiving portion 133, the protrusion 131 comes into contact with the inner peripheral surface of the fixing film 112 irrespective of size of the recording material P. A height 131*h* of the protrusion 131 is 1.6 mm.

In conveyance of the large-size sheet, the vicinity of the center portion of the fixing film 112 in the longitudinal direction is pulled toward the downstream side in the conveyance direction of the recording material P with respect to the film guide 130. Consequently, a gap between the fixing film 112 and the film guide 130 on the upstream side is reduced. This is because the fixing film 112 receives a force acting from the upstream side to the downstream side in the conveyance direction from the recording material P in the fixing nip Nf, and the shape of the fixing film 112 is deformed.

The shape of the fixing film 112 in the longitudinal direction will be described with reference to FIG. 10B. Since both end portions of the film guide 130 in the longitudinal direction are fixed to left and right side plates 134 of the device frame 138, movement of the film guide 130 toward the upstream side in the conveyance direction is regulated. Consequently, the shape of the fixing film 112 in conveyance of the small-size sheet is different from the shape of the fixing film 112 in conveyance of the large-size sheet. More specifically, the fixing film 112 is to be warped in an arched shape toward the upstream side in the conveyance direction of the recording material P. In this state, the protrusion 131 disposed in the vicinity of the center portion of the fixing device 100 in the longitudinal direction is in contact with the inner peripheral surface of the fixing film 112, which prevents the fixing film 112 from being warped toward the upstream side.

In an image forming apparatus 50 including the fixing device 100 of the comparative example, the LTR size sheets were continuously conveyed at 47 ppm, and the evaluation was performed. A result of the evaluation showed occurrence of image defects due to density decrease. These image defects were particularly obvious in a solid black pattern. The reason for the defects was considered to be due to the configuration in which the protrusion 131 of the film guide 130 and the inner peripheral surface of the fixing film 112 were in contact with each other irrespective of size of the recording material P as described above. A sliding resistance between the protrusion 131 and the fixing film 112 impaired running stability of the fixing film 112, and defectiveness occurred in unfixed toner images.

On the other hand, when the A5 size sheets were continuously conveyed at 30 ppm in the image forming apparatus 50 including the fixing device 100 of the comparative example, and the evaluation was performed, occurrence of defects, such as wrinkles in sheets, was not observed. The reason for this result was considered that the fixing film 112 was prevented from being warped in an arched shape toward the upstream side in the conveyance direction of the recording material P by the protrusion 131 as illustrated in FIG. 10B.

(Evaluation Result of Present Exemplary Embodiment)

A result of the evaluation of the present exemplary embodiment will be described with reference to FIGS. 11A and 11B and FIGS. 12A and 12B. The film guide 130 of the present exemplary embodiment is configured such that the protrusion 131, which does not protrude toward the pressure roller 110 beyond the film receiving portion 133, is disposed on the downstream side of the film guide 130.

Figure 11A:
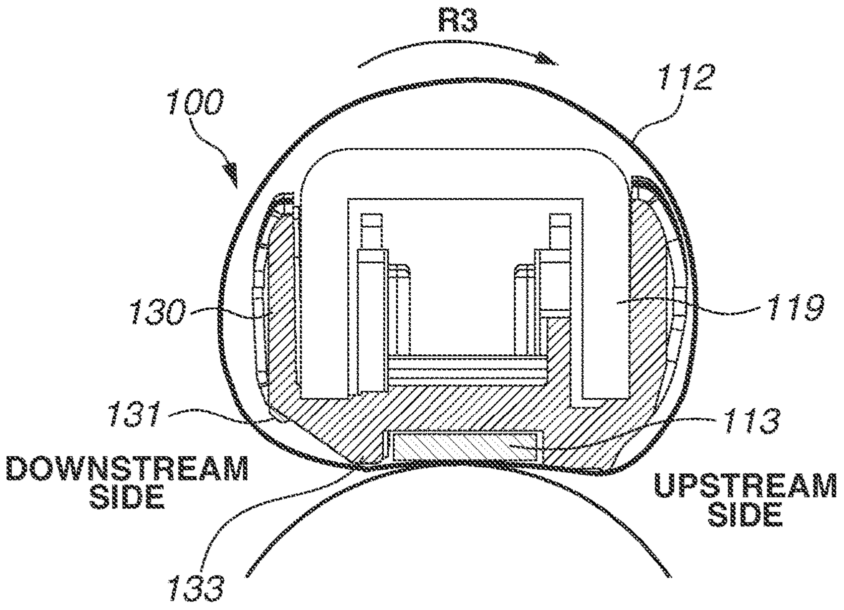
FIGS. 11A and 11B are diagrams illustrating a configuration of the film guide having a protrusion in the fixing device according to a first exemplary embodiment.
Figure 11B:
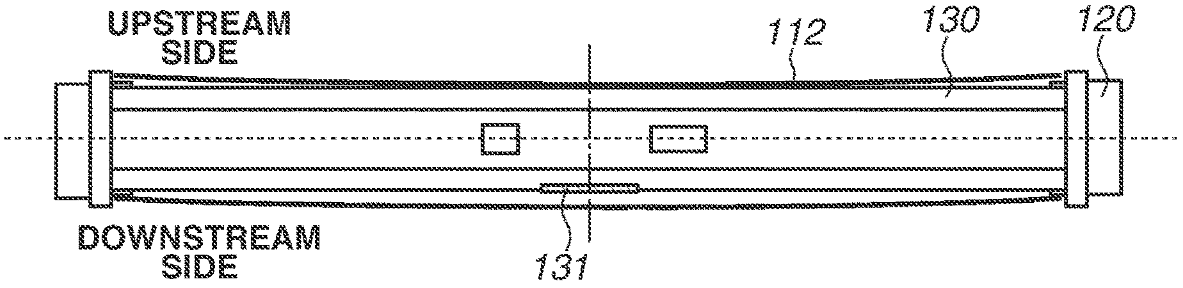
Figure 12A:
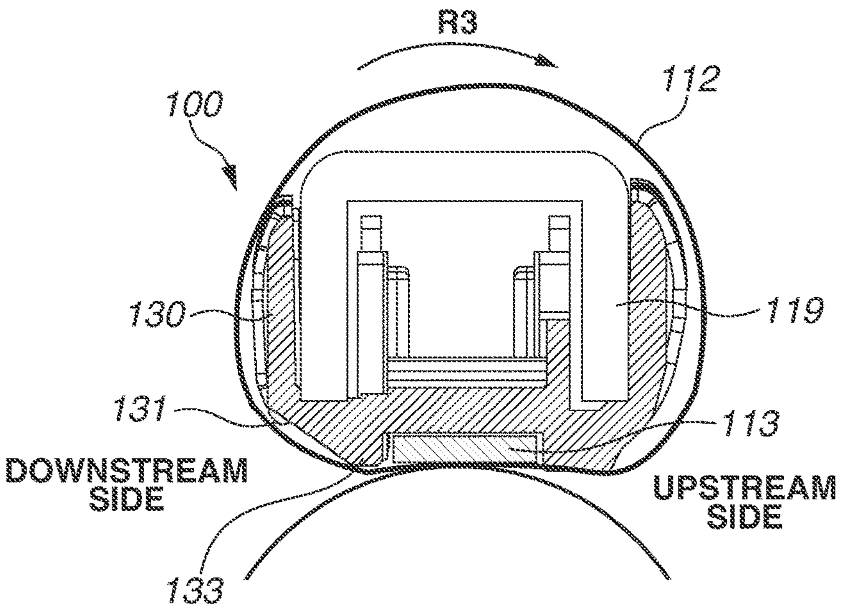
FIGS. 12A and 12B are diagrams illustrating the configuration of the film guide having the protrusion in the fixing device according to the first exemplary embodiment.

FIG. 11A is a diagram illustrating a configuration of the film guide 130 having the protrusion 131 in the fixing device 100 in the present exemplary embodiment. FIG. 11A is a cross-sectional view of the vicinity of the center portion of the fixing device 100 in the longitudinal direction in conveyance of the large-size sheet. With reference to FIG. 11B, a shape of the fixing film 112 in conveyance of the large-size sheet will also be described. FIG. 12A is a cross-sectional view of the vicinity of the center portion of the fixing device 100 in the longitudinal direction in conveyance of the small-size sheet. A shape of the fixing film 112 in conveyance of the small-size sheet will also be described with reference to FIG. 12B.

Figure 12B:
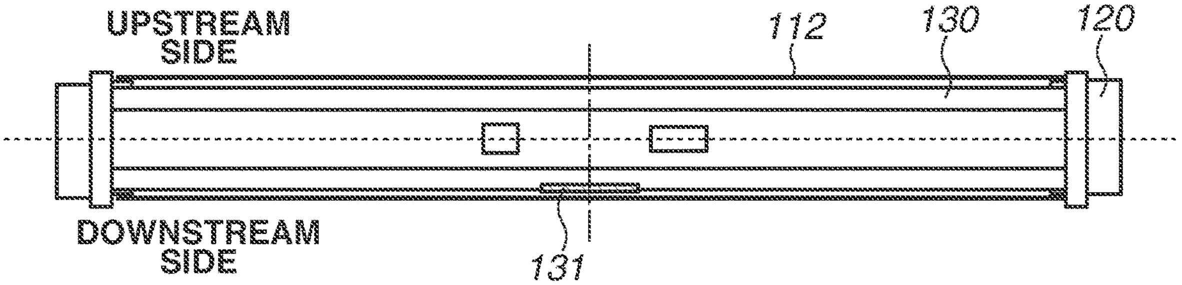

In the configuration of the present exemplary embodiment, since the protrusion 131 disposed on the film guide 130 does not protrude toward the pressure roller 110 beyond the film receiving portion 133, the protrusion 131 does not come into contact with the inner peripheral surface of the fixing film 112 in conveyance of the large-size sheet. On the other hand, in conveyance of the small-size sheet, the protrusion 131 comes into contact with the inner peripheral surface of the fixing film 112. With reference to FIG. 12B, a shape of the fixing film 112 in the longitudinal direction will be described. Since both end portions of the film guide 130 in the longitudinal direction are fixed to the left and right side plates 134 of the device frame 138, movement of the film guide 130 toward the upstream side in the conveyance direction is regulated. Consequently, the shape of the fixing film 112 in conveyance of the small-size sheet is different from the shape of the fixing film 112 in conveyance of the large-size sheet. More specifically, the fixing film 112 is to be warped in an arched shape toward the upstream side in the conveyance direction of the recording material P. In this state, the protrusion 131 disposed in the vicinity of the center portion of the film guide 130 in the longitudinal direction is in contact with the inner peripheral surface of the fixing film 112, which prevents the fixing film 112 from being warped toward the upstream side.

In the image forming apparatus 50 including the fixing device 100 of the present exemplary embodiment, the LTR size sheets were continuously conveyed at 47 ppm, and the evaluation was performed. A result of the evaluation showed neither wrinkles in the sheets nor occurrence of image defects. As illustrated in FIG. 11A, the protrusion 131 in the present exemplary embodiment does not come into contact with the inner peripheral surface of the fixing film 112 in conveyance of the large-size sheets. That is, the reason for this result was considered that, in conveyance of the large-size sheets, lowering of running stability of the fixing film 112 did not occur because of absence of contact between the inner peripheral surface of the fixing film 112 and the protrusion 131.

Meanwhile, when the A5 size sheets were continuously conveyed at 30 ppm in the image forming apparatus 50 including the fixing device 100 of the present exemplary embodiment, and the evaluation was performed, a result of the evaluation showed neither wrinkles in the sheets nor occurrence of image defects. The reason for this result was considered that the fixing film 112 was prevented from being warped in an arched shape toward the upstream side in the conveyance direction of the recording material P by the protrusion 131 as illustrated in FIG. 12B.

It was also considered that even in conveyance of the small-size sheets, because of a contact region between the protrusion 131 and the inner peripheral surface of the fixing film 112 that was set to be not more than necessary, lowering of running stability of the fixing film 112 was suppressed, and occurrence of image defects was also suppressed.

As described above, the protrusion 131 is disposed to the film guide 130 as in the present exemplary embodiment, whereby occurrence of wrinkles in the recording material P is suppressed and influences on images can also be suppressed.

In a second exemplary embodiment, a configuration for suppressing scraping that occurs on an end surface of the fixing film 112 will be described. The same reference numerals are given to the same components as those in the first exemplary embodiment, such as the image forming apparatus 50, and the redundant detailed description will be omitted.

In the image forming apparatus 50 including the fixing device 100 according to the first exemplary embodiment, 2000 sheets of the recording materials P having a size of 3×5 inches were continuously conveyed. In an observation of the fixing film 112 after the conveyance, slight "scraping" was observed on one end surface of the fixing film 112 which was in contact with the fixing flanges 120. In the present exemplary embodiment, a configuration in which the scraping of the end surface of the fixing film 112 can also be suppressed will be described.

In the present exemplary embodiment, a length 131L in the longitudinal direction of the protrusion 131 disposed on a downstream side of the film guide 130 is different from that in the first exemplary embodiment. The length 131L of the protrusion 131 in the present exemplary embodiment is longer than the recording material P having a minimum size of paper width which can be conveyed in the image forming apparatus 50 of the first exemplary embodiment, and shorter than the recording material P having a maximum size of paper width which can be conveyed in the image forming apparatus 50 of the first exemplary embodiment. Details are described below. Similar to the first exemplary embodiment, the protrusion 131 does not protrude toward the pressure roller 110 in the thickness direction beyond the film receiving portion 133 in the thickness direction. The protrusion 131 has such a shape that protrudes toward the pressure roller 110 beyond the side wall 132 on the downstream side in the conveyance direction.

(Protrusion 131 of Film Guide 130)

Figure 13:
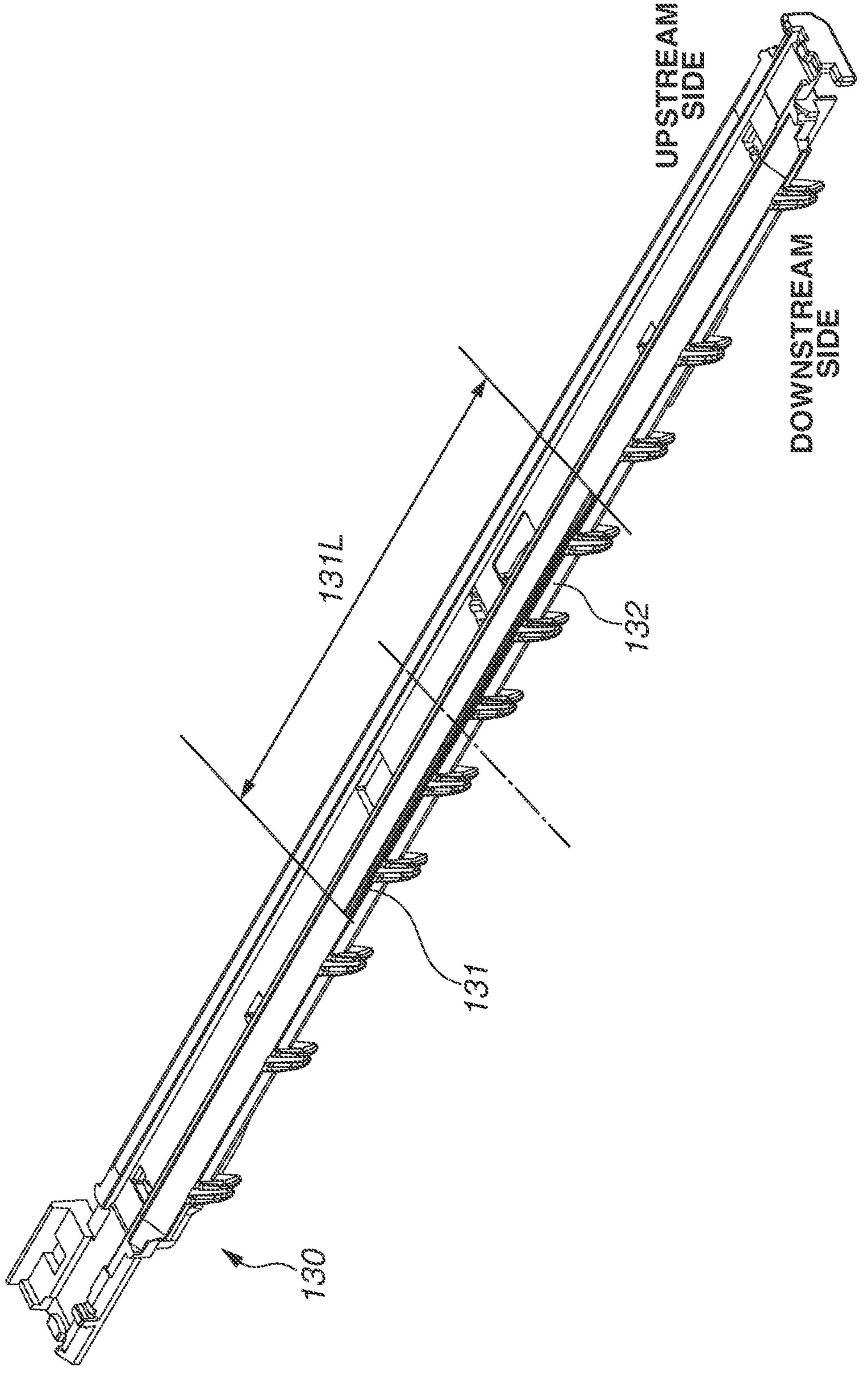
FIG. 13 is a perspective view illustrating a film guide according to a second exemplary embodiment.

A configuration of the protrusion 131 of the film guide 130, which is a feature of the present exemplary embodiment, will be described with reference to FIG. 13. FIG. 13 is a perspective view illustrating the film guide 130 of the present exemplary embodiment. As shown in FIG. 13, the protrusion 131 is disposed along the crown shape of the film guide 130 on the downstream side of the film guide 130 in the conveyance direction of the recording material P. The length 131L in the longitudinal direction of the protrusion 131 is 89 mm. That is, the length 131L of the protrusion 131 satisfies a relationship that the length 131L is longer than the 3×5 inch size sheet (sheet width: 76.2 mm) that is the recording material P of the minimum size which can be conveyed, and shorter than the LTR size sheet (sheet width: 216 mm) that is the recording material P of the maximum size which can be conveyed. The height 131H of the protrusion 131 is 0.3 mm, which is the same as the height 131H of the configuration of the first exemplary embodiment.

(Force in Longitudinal Direction Acting on Fixing Film 112)

A displacement of a center position of the recording material P being conveyed with respect to a center position of the fixing device 100 in the longitudinal direction (hereinafter, also referred to as "positional displacement") sometimes occurs. In a case where the positional displacement occurs, a force in the longitudinal direction acting on the fixing film 112 (hereinafter, also referred to as a "shifting force") may increase. This is also related to the non-sheet-passing area temperature rise of the pressure roller 110.

As described in the first exemplary embodiment, since the pressure roller 110 has a larger thermal expansion of the outer diameter in the non-sheet-passing area than in the sheet-passing area, in a case where the positional displacement of the recording material P occurs, a difference occurs between thermal expansion amounts on the left and right sides in the pressure roller 110. If a difference occurs between the left side conveyance force and the right side conveyance force in the fixing film 112, the shifting force with respect to the fixing film 112 increases. This is particularly obvious in continuous conveyance of small-size sheets in which the non-sheet-passing area temperature rise is large.

The reason for slight scraping that occurred on the end surface of the fixing film 112 in continuous conveyance of the 3×5 inch size sheets by using the configuration in the first exemplary embodiment was considered to be due to the fact that the fixing film 112 received the shifting force came into contact with and was rubbed against one of the fixing flanges 120.

(Evaluation Method)

An evaluation method of evaluating an operational advantage according to the present exemplary embodiment will be described. In the present exemplary embodiment, 2000 sheets of the 3×5 inch size sheets were continuously conveyed at 30 ppm, and the condition of the fixing film 112 was observed.

(Evaluation Result of Present Exemplary Embodiment)

A result of the evaluation of the present exemplary embodiment will be described with reference to FIGS. 14A and 14B.

Figure 14A:
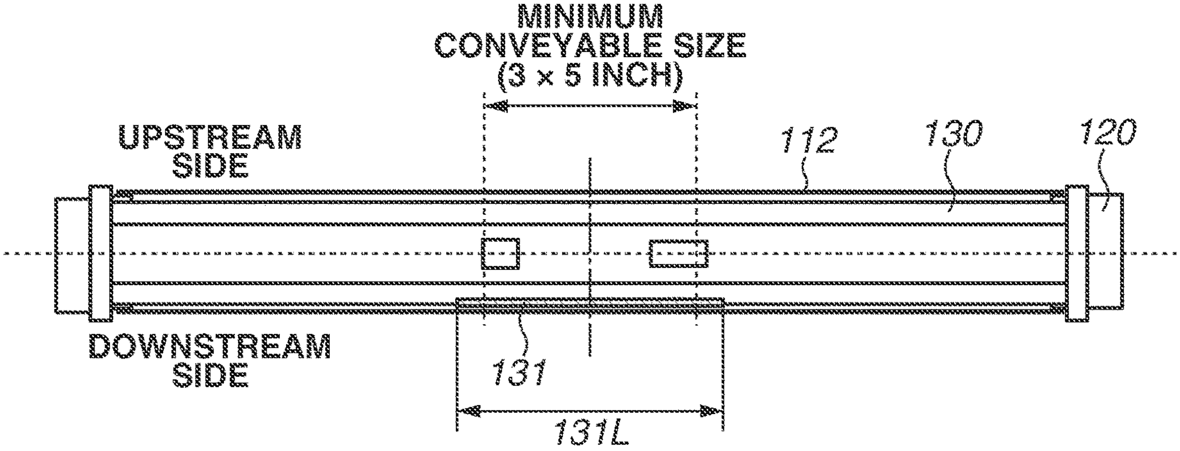
FIGS. 14A and 14B are diagrams illustrating a configuration of the film guide having a protrusion in the fixing device according to the second exemplary embodiment.

FIG. 14A is a diagram illustrating a relationship between the recording material P of the minimum size which can be conveyed in the image forming apparatus 50, and the length 131L in the longitudinal direction of the protrusion 131 in the present exemplary embodiment. FIG. 14B is a diagram illustrating a relationship between the recording material P of the minimum size which can be conveyed in the image forming apparatus 50 and the length 131L in the longitudinal direction of the protrusion 131 in the first exemplary embodiment.

Figure 14B:
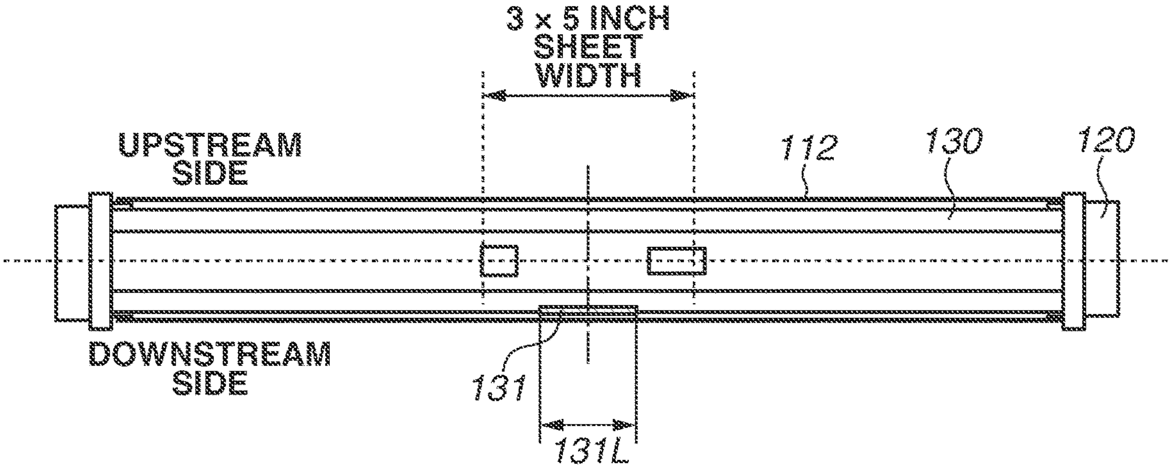

As illustrated in FIGS. 14A and 14B, in a case where the 3×5 inch size sheets that are the recording materials P of the minimum size which can be conveyed are continuously conveyed, the region where the inner peripheral surface of the fixing film 112 and the protrusion 131 come into contact with each other is larger in the present exemplary embodiment than in the first exemplary embodiment. This is because the length 131L of the protrusion 131 in the present exemplary embodiment satisfies the relationship that the length 131L is longer than the 3×5 inch size sheet that is the recording material P of the minimum size which can be conveyed, and is shorter than the LTR size sheet that is the recording material P of the maximum size which can be conveyed.

In a case where the shifting force is generated in the fixing film 112 by the thermal expansion of the pressure roller 110, the shifting force is decreased more with the configuration in the present exemplary embodiment in which the contact region between the inner peripheral surface of the fixing film 112 and the protrusion 131 is relatively large. More specifically, by the fixing film 112 and the protrusion 131 coming into contact with each other, a frictional force in a direction opposite to a shifting direction of the fixing film 112 is applied to the fixing film 112, whereby the shifting force generated in the fixing film 112 can be reduced.

In the image forming apparatus 50 including the fixing device 100 according to the present exemplary embodiment, 2000 sheets of 3×5 inch size sheets were continuously conveyed at 30 ppm, and the fixing film 112 was observed. The shifting force was suppressed on either end surface of the fixing film 112 in the longitudinal direction as described above. Thus, in addition to the effect of the first exemplary embodiment, scraping on the end surface of the fixing film 112 was suppressed.

In a third exemplary embodiment, a configuration for suppressing wearing of the inner peripheral surface of the fixing film 112 will be described. The same reference numerals are given to the same components as those in the first exemplary embodiment, such as the image forming apparatus 50, and the redundant detailed description will be omitted.

(Protrusion 131 of Film Guide 130)

Figure 15A:
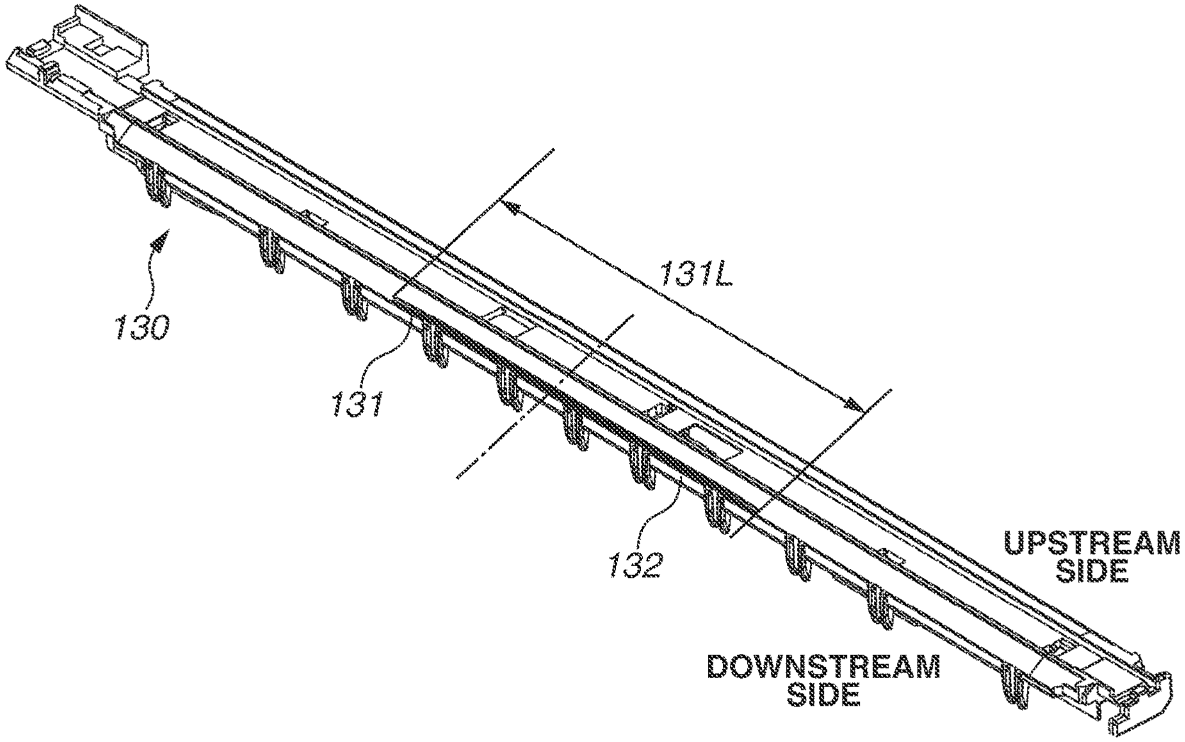
FIGS. 15A and 15B are diagrams illustrating a configuration of a film guide having a protrusion in a fixing device according to a third exemplary embodiment.
Figure 15B:
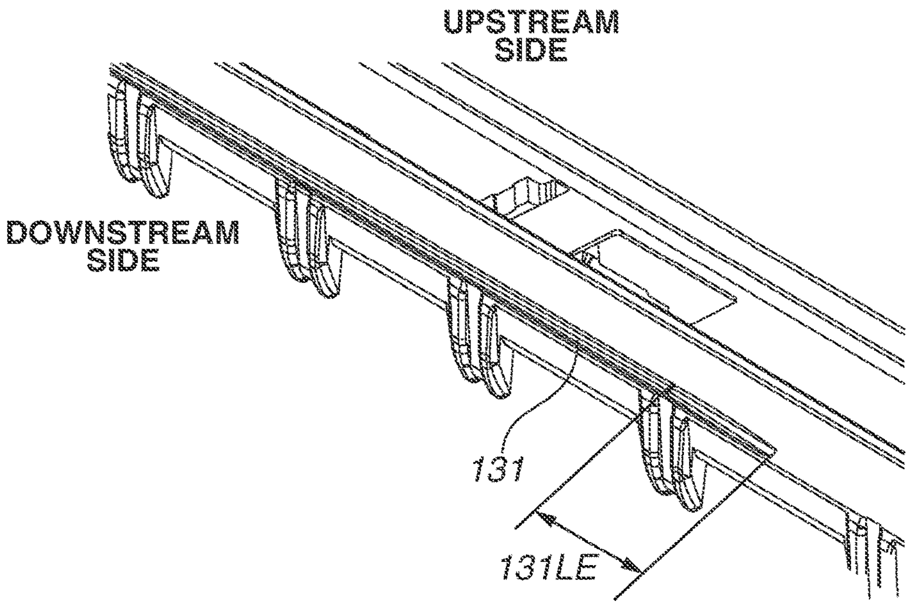

A configuration of the protrusion 131 of the film guide 130, which is a feature of the present exemplary embodiment, will be described with reference to FIGS. 15A and 15B. As illustrated in 15A, in the present exemplary embodiment, the shape of each end portion of the protrusion 131 disposed on the downstream side of the film guide 130 is different from that in the second exemplary embodiment. FIG. 15B is an enlarged view of an end portion of the protrusion 131. In the present exemplary embodiment, each end portion of the protrusion 131 is formed such that the height thereof is gradually lowered in an end portion region 131LE of the protrusion 131. The length of the end portion region 131LE of the protrusion 131 is 15 mm. The length 131L in the longitudinal direction of the protrusion 131 is 89 mm, and the height 131H of the protrusion 131 is 0.3 mm, which are the same as those in the configuration of the second exemplary embodiment.

In the present exemplary embodiment, the shape of the protrusion 131 of the film guide 130 is formed such that the height gradually decreases with increase in the distance from the center portion in the longitudinal direction, whereby wearing of the inner peripheral surface of the fixing film 112 is suppressed. This is resulted from the gradual decrease of the height of the protrusion 131, in which case a step in the contact region between the inner peripheral surface of the fixing film 112 and the protrusion 131 is eliminated. In this way, in addition to the effect of the second exemplary embodiment, wearing of the inner peripheral surface of the fixing film 112 due to the inner peripheral surface of the fixing film 112 and the protrusion 131 coming into contact with each other is also suppressed.

In the present exemplary embodiment, the description has been given of the example case of the shape, with regard to the height of the protrusion 131 of the film guide 130, of both end portions that is inclined. However, the configuration is not limited thereto, and any shape is applicable as long as the height of the protrusion 131 of the film guide 130 is the highest at the center portion in the longitudinal direction and gradually decreases with increase in the distances from the center portion to both end portions. For example, the same effect can be obtained with a configuration in which a plurality of protrusions is formed substantially symmetrically with respect to the sheet passing reference.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-005656, filed Jan. 18, 2023, which is hereby incorporated by reference herein in its entirety.

What is claimed is:

1. A fixing device comprising:

a first rotation member;

a heater having an elongated shape and configured to include a heating element and a substrate on which the heating element is disposed, wherein the heater is disposed in an internal space of the first rotation member;

a heater holder configured to hold the heater; and a second rotation member, wherein, to fix an image formed on a recording material, the heater and the second rotation member nip the first rotation member therebetween, and the image formed on the recording material is heated at a nip portion via the first rotation member, wherein the heater holder has a protrusion that is disposed at a position, which is outside the nip portion and on a downstream side in a conveyance direction of the recording material, and comes into contact with the first rotation member, and wherein, when a direction of a long side of a first surface of the substrate on which the heating element is disposed is a longitudinal direction, a direction orthogonal to the longitudinal direction on the first surface is a lateral direction, and a direction orthogonal to the longitudinal direction and the lateral direction is a thickness direction, the protrusion protrudes in the thickness direction toward the second rotation member without crossing a nip tangent line that passes through a contact surface between the first rotation member and the second rotation member and extends parallel to the contact surface, and a length in the longitudinal direction of the protrusion is shorter than a length in the longitudinal direction of the recording material of a maximum size which is able to be conveyed.

2. The fixing device according to claim 1, wherein the length in the longitudinal direction of the protrusion is shorter than a length in the longitudinal direction of the recording material of a minimum size which is able to be conveyed.

3. The fixing device according to claim 1, wherein the length in the longitudinal direction of the protrusion is longer than a length in the longitudinal direction of the recording material of a minimum size which is able to be conveyed.

4. The fixing device according to claim 1, wherein the protrusion is higher at a center portion than at end portions in the longitudinal direction.

5. The fixing device according to claim 1, wherein the protrusion does not come into contact with the first rotation member in conveyance of the recording material of the maximum size which is able to be conveyed, and comes into contact with the first rotation member in conveyance of the recording material of a minimum size which is able to be conveyed.

6. The fixing device according to claim 1, wherein the first rotation member is a film, wherein the second rotation member is a pressure roller, and wherein the heater is disposed in an internal space of the film, the heater and the pressure roller nip the film therebetween, and the image formed on the recording material is heated at the nip portion via the film.

7. An image forming apparatus comprising:

the fixing device according to claim 1; and an image forming unit configured to form the image on the recording material, wherein the fixing device is configured to fix the image formed by the image forming unit on the recording material.

8. A fixing device comprising:

a first rotation member;

a heater having an elongated shape and configured to include a heating element and a substrate on which the heating element is disposed, wherein the heater is disposed in an internal space of the first rotation member;

a heater holder configured to hold the heater; and a second rotation member, wherein, to fix an image formed on a recording material, the heater and the second rotation member nip the first rotation member therebetween, and the image formed on the recording material is heated at a nip portion via the first rotation member, wherein the heater holder has a protrusion that is disposed at a position, which is outside the nip portion and on a downstream side in a conveyance direction of the recording material, and comes into contact with the first rotation member, and wherein, when a direction of a long side of a first surface of the substrate on which the heating element is disposed is a longitudinal direction, a direction orthogonal to the longitudinal direction on the first surface is a lateral direction, and a direction orthogonal to the longitudinal direction and the lateral direction is a thickness direction, the protrusion protrudes toward the second rotation member, the protrusion does not come into contact with the first rotation member in conveyance of the recording material having a first length in the longitudinal direction, and comes into contact with the first rotation member in conveyance of the recording material having a second length in the longitudinal direction, and the second length is shorter than the first length.

9. The fixing device according to claim 8, wherein a length in the longitudinal direction of the protrusion is shorter than a length in the longitudinal direction of the recording material of a minimum size which is able to be conveyed.

10. The fixing device according to claim 8, wherein a length in the longitudinal direction of the protrusion is longer than a length in the longitudinal direction of the recording material of a minimum size which is able to be conveyed.

11. The fixing device according to claim 8, wherein the protrusion is higher at a center portion than at end portions in the longitudinal direction.

12. The fixing device according to claim 8, wherein the first rotation member is a film, wherein the second rotation member is a pressure roller, and wherein the heater is disposed in an internal space of the film, the heater and the pressure roller nip the film therebetween, and the image formed on the recording material is heated at the nip portion via the film.

13. An image forming apparatus comprising:

the fixing device according to claim 8; and an image forming unit configured to form the image on the recording material, wherein the fixing device is configured to fix the image formed by the image forming unit on the recording material.

* * * * *